Oct. 27, 1964 L. DIETCH 3,154,641

SINGLE DIODE FM STEREO MULTIPLEX DETECTOR

Filed May 14, 1962 3 Sheets-Sheet 1

INVENTOR.
Leonard Dietch
BY James T. Barr
ATTY.

INVENTOR.
Leonard Dietch
BY James T. Barr
ATTY.

SINGLE DIODE FM STEREO MULTIPLEX DETECTOR

Filed May 14, 1962 3 Sheets-Sheet 3

INVENTOR.
Leonard Dietch
BY James T. Barr
ATTY.

United States Patent Office 3,154,641

Patented Oct. 27, 1964

3,154,641

SINGLE DIODE F.M. STEREO MULTIPLEX DETECTOR

Leonard Dietch, Skokie, Ill., assignor to Admiral Corporation, Chicago, Ill., a corporation of Delaware Filed May 14, 1962, Ser. No. 194,601
9 Claims. (Cl. 179—15)

This invention relates in general to frequency modulation stereo demultiplexing systems and in particular to novel means in said systems for detecting the stereo information.

Recently the Federal Communications Commission adopted certain standards with regard to FM stereo broadcasting. According to these standards, the composite stereo signal transmitted by the station comprises a left channel plus a right channel ($L+R$) audio summation signal, a left channel minus a right channel ($L-R$) amplitude modulated suppressed carrier audio difference signal and a pilot signal. In practice, the separate L and R signals are first matrixed to produce $L+R$ and $L-R$ signals. The $L-R$ signal is then amplitude modulated onto a 38 kilocycle per second carrier wave which is thereafter suppressed, leaving only the sideband information. The 38 kc. carrier is actually a subcarrier with respect to the station carrier, but will be called a carrier for simplicity. In order to conserve band space, yet allow accurate regeneration of the suppressed 38 kilocycle per second carrier in the receiving apparatus, a pilot signal, equal to one-half of the carrier frequency, is generated. The $L+R$ summation signal, the $L-R$ sideband information, and the pilot signal are then used to frequency modulate the main station carrier in a conventional manner.

It will be appreciated that recovery of the L and R signals may be accomplished by the process of separating the $L+R$ information from the $L-R$ sideband information, combining the $L-R$ sideband information with a regenerated 38 kilocycle per second carrier, detecting the $L-R$ audio information, and matrixing the $L+R$ and the $L-R$ audio information to obtain separate L and R signals. Systems employing this technique are well known in the art. However, an analysis of the wave forms involved in producing the composite stereo signal leads to the conclusion that other means of detecting the L and R signals may be advantageously employed.

In particular this analysis shows that matrixing is not required, but rather than the individual R and L signals may be directly detected by separate detectors. This demultiplexing method will be termed envelope detection and it will also be shown that with it a single detector may be used to separately detect the individual R and L signals simultaneously.

Accordingly, the principal object of this invention is to provide novel means for detecting an FM stereo signal.

A broad object of this invention is to provide a novel detector for detecting a signal A and a signal B from a composite signal made up of an $A+B$ component and an $A-B$ amplitude modulation component.

Another object of this invention is to provide an FM stereo detector which is simple, reliable, and more economical than similar present or prior art detectors.

A still further object of this invention is to provide an FM stereo detector utilizing a single diode for recovering both the L and R signals.

Other objects and advantages of this invention will become apparent upon reading the detailed description in conjunction with the drawings in which.

Figure 1:
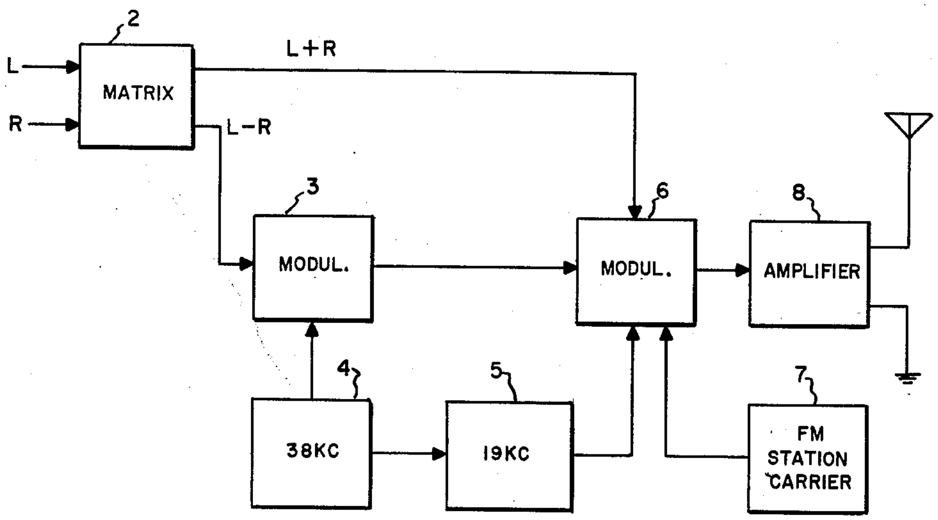
FIG. 1 depicts an FM multiplex transmitter in block form.

Referring now to FIG. 1, a block diagram of an FM stereo transmitter is shown. Separate L and R input signals are applied to a matrix network 2 which yields separate $L+R$ and $L-R$ audio outputs. The $L-R$ component is coupled to a balanced modulator 3 which is driven from a 38 kilocycle per second oscillator 4. Balanced modulator 3 operates to amplitude modulate the $L-R$ component onto the 38 kilocycle per second carrier wave and suppress the carrier wave. The 38 kilocycle per second oscillator 4 controls the operation of a 19 kc. oscillator 5 to insure that both oscillators are accurately related in phase and frequency. The output of modulator 3, the 19 kc. signal from oscillator 5 and the $L+R$ audio summation signal are all coupled to the main modulator 6 which is driven from the FM station carrier generator 7. The information emanating from the above outputs is used to FM modulate the station carrier and the resultant modulated RF signal is amplified by amplifier 8 and transmitted in a conventional manner.

It should be borne in mind that other methods of producing the composite stereo signal may also be used. In particular a time division multiplex arrangement wherein the left and right channels are alternatively sampled at a 38 kc. rate may be readily employed. The end result will be the same regardless of the method utilized to form the composite signal.

At this point a digression will be made to analyze some of the signal wave forms. Assume that the L signal is a pure sine wave having a predetermined frequency and amplitude as shown by waveform A. Assume further that the R signal, shown by waveform B, is a pure sine wave having the same predetermined amplitude as the L signal, but having a frequency which is two-thirds that of the L signal. By graphical construction, as well as by actual observation on an oscilloscope, the $L+R$ signal (shown by waveform C) and the $L-R$ signals (shown by waveform D), result. A carrier signal (with the carrier wave shown greatly decreased in frequency for purposes of clarity) appears as shown by waveform E. The product of amplitude modulating carrier signal E by the $L-R$ signal D is shown by F, which is seen to be a familiar double envelope AM modulated wave.

While in practice and in the circuit of FIG. 1 the carrier E is suppressed either during or immediately after modulation by the $L-R$ signal D, for purposes of illustration in this description it will be assumed to be unsuppressed. This assumption postpones the phase reversals which occur and enables one to graphically add and subtract the waveforms with less difficulty. It should be noted however, that the end result will be the same regardless of when the carrier is suppressed, i.e., either before or after combination of the modulated wave with the $L+R$ information.

The waveform F which represents the modulated carrier wave is now added to the $L+R$ signal, indicated by the dashed line. By adding the upper envelope and the lower envelope of modulated signal F to the $L+R$ signal, the very interesting wave form G results. In G it is clearly seen that the upper envelope corresponds to a double amplitude L signal and the lower envelope corresponds to a double amplitude R signal. If the carrier E is now subtracted (carrier suppression) from the resultant waveform G, wave form H is obtained which is recognizable to those skilled in the FM multiplexing art as a familiar interleaved envelope composite stereo signal. If one bears in mind that each point on waveform H where the two envelopes come together represents a phase reversal of the 38 kc. carrier, it can readily be perceived that one envelope corresponds to 2L and the other envelope corresponds to 2R.

Returning for a moment to waveform G, it should also be apparent that with this waveform the L and R envelopes may be separately detected by appropriate use of diode networks. This may readily be accomplished by applying waveform G to the center tap of a transformer, the ends of which are coupled to diode rectifier networks. It should also be noted that the distance between the upper and lower envelopes of waveform G is dependent upon the amplitude of the carrier wave and, if this distance may be decreased by subtraction of the carrier (as shown by H), it may also be increased by carrier exaltation or addition of more carrier.

For illustrative simplicity, the 19 kc. pilot has been ignored since it is not germane to the point under consideration. In any event the pilot signal, as transmitted, is very low in amplitude and has little effect on the overall wave shapes shown.

Figure 3:
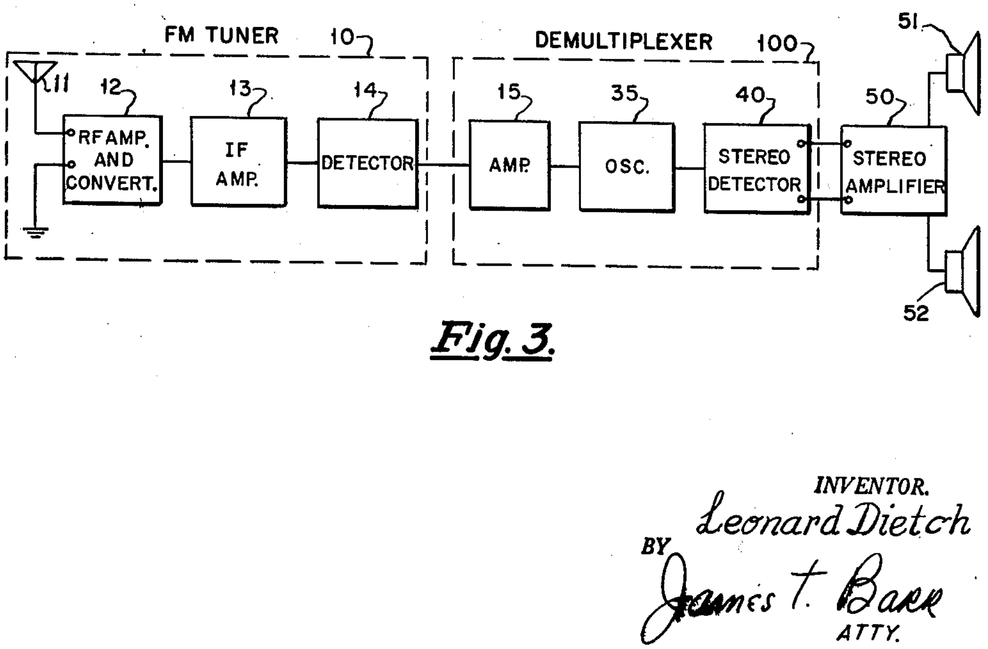
FIG. 3 is a block diagram of receiving apparatus for FM stereo broadcasts.

Referring now to FIG. 3, a block diagram of an FM tuner is shown in dashed line box 10. An antenna 11 couples a received broadcast signal from an FM transmitting station to radio frequency amplifier and converter 12 where, in a well known manner, the selected station carrier is heterodyned with a locally generated signal to produce an intermediate frequency signal. The resultant signal is amplified by intermediate frequency amplifier 13 and detected by detector 14. The FM tuner is in all respects conventional and fully compatible, that is, responsive to receipt of a monaural transmission, the output of detector 14 produces an audio frequency monaural signal, and responsive to receipt of an FM stereophonic signal, the output of detector 14 produces an audio summation signal, sidebands of an audio difference signal and a pilot signal.

A block diagram of a demultiplexer unit is shown in dashed line box 100. The output of detector 14 is coupled to an amplifier 15 which includes circuitry for separating the pilot signal. The pilot signal is coupled to an oscillator 35 which is very carefully locked in phase and frequency to reproduce the original 38 kc. carrier. Both amplifier 15 and oscillator 35 feed stereo detector 40 in which the regenerated 38 kc. carrier is combined with the audio $L+R$ signal and the sidebands of the $L-R$ signal. Stereo detector 40 has two outputs, one of which develops a pure R signal and the other of which develops a pure L signal. These signals are coupled to stereo amplifier 50 where they are amplified in a well known manner and drive a pair of stereo speakers 51 and 52 to reproduce the R and L signals in acoustical form.

Figure 4:
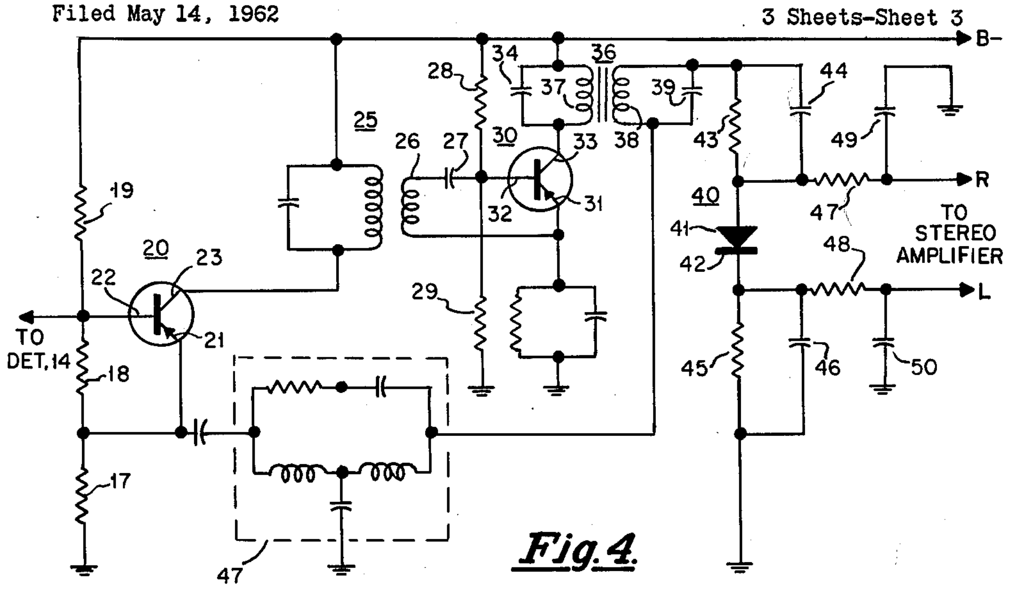
FIG. 4 is a schematic diagram of the demultiplexer of FIG. 3.

In FIG. 4 the circuitry included in demultiplexer 100 is shown in detail. A transistor 20 having an emitter 21, a base 22 and a collector 23 is arranged as an amplifier for the composite stereo signal from detector 14. Collector 23 has a tuned load circuit 25 which is tuned to the frequency of the pilot signal in the composite stereo signal. Serially connected resistors 17, 18, and 19 are connected between B— and ground and provide proper bias for transistor 20. Since tuned circuit 25 is tuned to the frequency of the pilot signal, the audio summation and the sideband information signals do not develop appreciable voltages therein. With respect to these latter signals, transistor 20 acts as an emitter follower and the audio summation signal and the sideband information signal appear across resistor 17.

Winding 26 is coupled to tuned circuit 25 and impresses a voltage, through a capacitor 27, between the emitter 31 and base 32 of transistor 30. Resistors 28 and 29 bias transistor 30 so that it is operating on the nonlinear portion of its operating characteristic. Consequently, the 19 kc. pilot signal generates numerous harmonics in the collector load circuit of transistor 30. Collector 33 is connected, through the parallel combination of a capacitor 34 and the primary winding 37 of a transformer 36, to a source of B— potential. Winding 37 and capacitor 34 are tuned to 38 kc. and respond to the appropriate harmonic of the pilot frequency. It should be readily apparent that a more conventional oscillator may be used with equal facility.

Transformer 36 has a secondary winding 38 and a capacitor 39 coupled thereacross. Secondary winding 38 and capacitor 39 are tuned to 38 kc. The lower end of winding 38 is connected through a filter and sideband peaking network 47 to emitter 21 of transistor 20. The filter traps out any FCC subsidiary carrier authorization (SCA) transmissions to prevent interference therefrom. Thus, the secondary 38 of transformer 36 has three signals applied to it, the first being the developed 38 kc. carrier wave, the second being the audio summation component ($L+R$) and the third being the audio difference sideband information ($L-R$). It should also be noted that the 19 kc. pilot may also be trapped in the filter and peaking network 47, if desired.

The stereo detector comprises a diode 40 having an anode 41 and a cathode 42. Anode 41 is connected to the upper end of transformer winding 38 through the parallel combination of resistor 43 and capacitor 44 and cathode 42 is connected to ground through the parallel combination of resistor 45 and capacitor 46. Deemphasis networks comprising resistor 47 and capacitor 49, and resistor 48 and capacitor 50 are connected to anode 41 and cathode 42, respectively. The lower end of transformer winding 38 is connected to ground through filter and sideband peaking network 47 and resistor 17. It may be seen that the $L+R$ audio summation signal, the $L-R$ sideband information and the regenerated 38 kc. carrier are all applied to diode 40. With the diode polarity as shown and the signal oriented as shown by waveform G, the R signal is taken from anode 41 and the L signal is taken from cathode 42.

Figure 2:
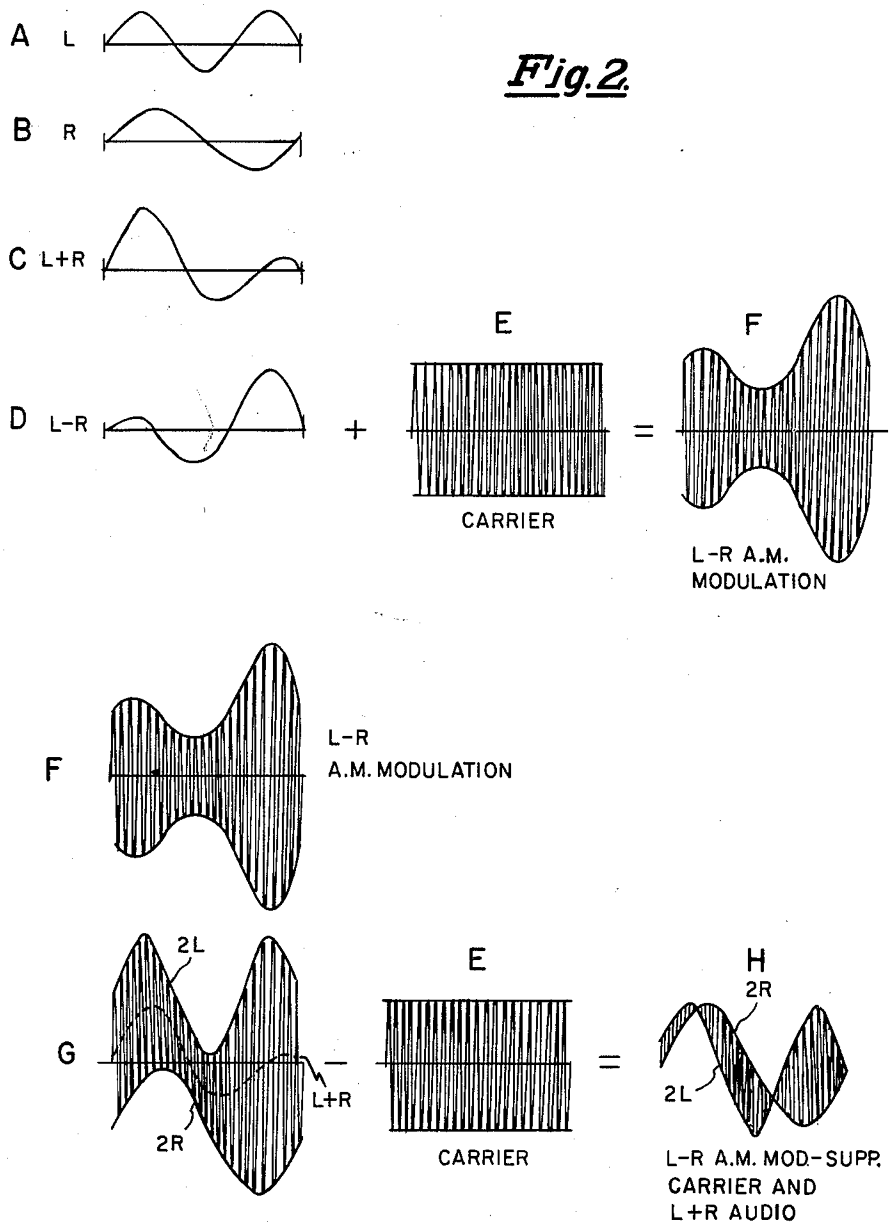
FIG. 2 shows a series of wave forms obtained in producing a sample composite stereo signal.
Figure 5:
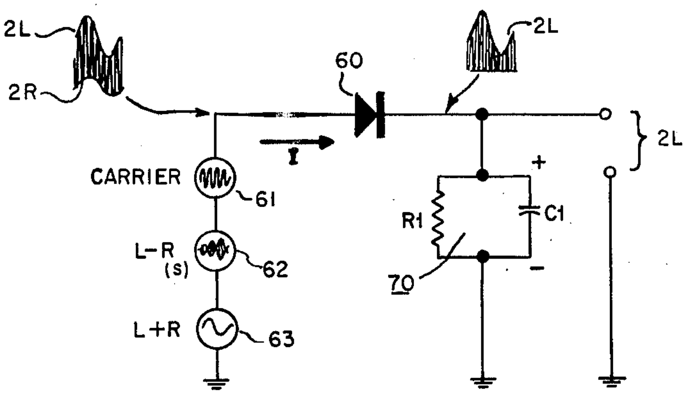
FIGS. 5 and 6 are simplified diagrams of the novel detector circuit useful in explaining the operation thereof.
Figure 6:
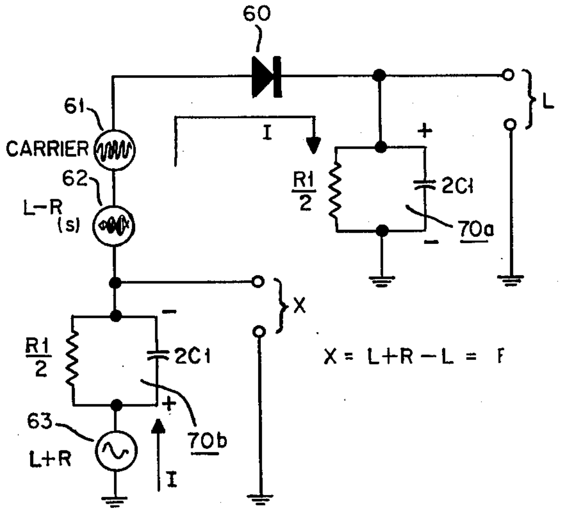

FIGS. 2, 5 and 6 are helpful in understanding the operation of diode 40 in detecting separate L and R signals from the composite stereo signal. It will be recalled that waveform G may be readily detected by the use of a simple diode network to obtain an output equal to 2L.

In FIG. 5 there is shown a simplified schematic diagram including three generators 61, 62 and 63, all connected in series with a diode 60 and a load circuit 70, which load circuit comprises a resistance R1 and a capacitance C1. Generator 61 is assumed to supply the 38 kc. carirer wave E, generator 62 the $L-R$ sideband information shown pictorially in outline by waveform D, and generator 63 the $L+R$ audio information shown by waveform C. It is further assumed that the amplitude of the 38 kc. carrier supplied by generator 61 is sufficient to elevate the entire upper envelope of the composite stereo signal above the zero axis. A representative signal with an upper envelope corresponding to 2L and a lower envelope corresponding to 2R is indicated at the top of generator 61. It is further assumed that the resistance of diode 60 is much smaller than the resistance of R1 and that the time constant of the combination of R1 and C1 is much greater than the period of the carrier wave. In other words, it is assumed that diode 60 and R1–C1 function as a peak detector arrangement which follows the upper envelope of the waveform applied to it (and ignores the lower envelope). Under these conditions, current I flows and the voltage appearing across R1–C1 is 2L.

In FIG. 6, the circuit of FIG. 5 has been rearranged to split the load circuit 70 into two load circuits **70*a* and 70*b*, each being one-half of the original load 70. Load circuit 70*a* is interposed between diode 60** and ground and comprises a resistor $$\frac{R1}{2}$$

in parallel with a capacitor 2C1. Load circuit 70*b* comprises a resistance of value $$\frac{R1}{2}$$

and a capacitance of value 2C1 connected in parallel and interposed between generator 62 and generator 63. It will be noted that the overall circuit has not been changed, only rearranged and hence the current I still flows. However, in traversing load circuit 70*a*, a voltage L, instead of 2L as in FIG. 5, is developed since the resistance of load 70*a* has been decreased by a factor of 2. The current I also traverses load 70*b* and develops a voltage L thereacross having the indicated polarity. If a second output is taken from the junction of load 70*b* and generator 62, a simple addition of potentials yields the following equation for the output potential X:

$$X=L+R(\text{Gen. }63)-L(\text{voltage developed across load }70b)$$

$$X=L+R-L$$
$$X=R$$

It may therefore be seen that, by dividing the load into two parts and rearranging the circuit somewhat, the detector including only a single diode 60 may be utilized to reproduce both envelopes of the waveform applied to it.

This is what occurs in the stereo detector of FIG. 4. The $L+R$ audio signal and the $L-R$ sideband information are obtained from across resistor 17. The regenerated 38 kc. carrier is obtained from transformer secondary winding 38. It should be apparent that it is of no consequence in what order the individual signals are combined one with another or whether they are represented by individual serially connected generators as shown in FIGS. 5 and 6.

A simplified mathematical analysis of the operation of the circuit of FIG. 4 may be more readily understood by those skilled in the art. In the following, certain simplifying assumptions have been made. These are:

(1) The L and R signals are pure sine waves.
(2) The pilot signal is insignificant.
(3) All generators are of zero impedance.
(4) All circuit elements are ideal.
(5) The carrier reinsertion is such as to result in a reconstituted wave of less than 50% modulation.
(6) The following arbitrary relationships obtain:
 $l=L\sin w_L t$,
 $l$ is the instantaneous left channel signal
 $r=R\sin w_R t$,
 $r$ is the instantaneous right channel signal
$e_c=E_c\sin W_c t$, $e_c$ is the instantaneous carrier voltage
 $W_L, W_R<<W_c$; $R, L\leqq\frac{1}{2}$; $-1\leqq(l+r), (l-r)\leqq+1$ Before writing a voltage equation for the diode circuit of FIG. 4 we must find the generator voltage $e_{gen}$. $e_{gen}$ comprises the voltage across resistor 17 and the voltage across transformer winding 38 (assuming SCA trap 47 has zero impedance at the frequencies under consideration). When combined, the resultant voltage represents an audio summation signal and an amplitude modulated audio difference signal (the modulation of which never falls below 50%).

Therefore we may write:

$$e_{gen}=e_{\text{audio sum.}}+e_c\ (\text{mod. by audio diff.})$$

and therefore $$e_{gen}=(l+r)+E_c[2+(l-r)]\sin w_c t$$

where the last expression is recognizable as the conventional one for a carrier $E_c$ modulated by a signal $(l-r)$. The constant 2 is employed to satisfy the percentage modulation criterion established above.

Assuming for further simplification that $E_c=1$, $$e_{gen}=(l+r)+[2+(l-r)]\sin W_c t$$

By inspection it may readily be seen that the equation for $e_{gen}$ defines a wave having the general characteristics of waveform G.

The locus of the positive envelope of this wave is:

$$e_{pos}=(l+r)+[2+(l-r)]$$
$$e_{pos}=2l+2$$

Similarly the locus of the negative envelope is:

$$e_{neg}=(l+r)-[2+(l-r)]$$
$$e_{neg}=2r2$$

Now writing the voltage equation from the ground end of resistor 17 to anode 41 of diode 40, and remembering that diode 40 conduction is proportional to the positive envelope of the wave $$e_{41}=e_{gen}+\text{voltage drop across resistor 43 and capacitor 44}$$

Now the diode load consists of resistors 43 and 45 and their associated capacitors. By adjustment of the resistors (without changing the series value of the combination) the proportion of $e_{pos}$ that each will bear may be varied. In the circuit, resistors 43 and 45 are equal and hence each has a voltage of $e_{pos/2}$ developed across it. (With diode 40 poled as shown, the potentials will be + at the upper ends of resistors 43 and 45 and − at the lower ends.) Therefore, $$e_{41}=e_{gen}+\frac{e_{pos}}{2}$$
$$=[(l+r)+[2+(l-r)]\sin W_c t]+\left[-\frac{(2l+2)}{2}\right]$$
$$=l+r+[\text{R.F. term}]-l-1$$

Thus the voltage from anode 41 to ground includes two audio terms, an R.F. term and a D.C. term. Resistor 47 and capacitor 49 filter out the R.F. term and the output appearing at the junction of resistor 47 and capacitor 49 is:

$$e_{49}=l+r-l-1=\underline{r}-\underline{1}$$

Similarly, $$e_{42}=\text{voltage from cathode 42 to ground}$$
$$=\frac{+e_{pos}}{2}=\frac{2l+2}{2}\text{ and }e_{50}=l+1$$

Hence it is seen that the $l$ and $r$ signals are separated and each appears along with a D.C. term, which may be conveniently eliminated.

It will be understood that, since the composite stereo signal appears as shown by waveform H, the regenerated 38 kc. may have to be exalted somewhat to eliminate any crossing of the L and R envelopes. However it is not necessary to exalt the carrier to the extent shown in FIGS. 5 and 6 since these circuits will work as well with sufficient direct current bias applied to diode 60 to insure that the entire upper envelope is in the diode's conductive region.

It should also be noted that both biasing methods, i.e., exalted carrier and direct current are capable of compatible stereophonic-monophonic operation. In the case of carrier exaltation however, it will be necessary to utilize a continuously running oscillator to preserve compatibility for monophonic signals. In the direct current bias situation compatibility is not dependent upon operation of an oscillator in the monophonic mode.

What has been described is a novel detector especially suited for detection of stereo FM signals, but also well suited for detection of any composite signal comprising an $A+B$ component and an $A-B$ amplitude modulation component where the frequency of the carrier of said last mentioned component is high with respect to the frequency of the modulating signal. It is understood that numerous modifications and rearrangements of the circuit may be made without departing from the true spirit and scope of the invention as set forth in the following claims.

The embodiments of the invention in which an exclusive property or privilege is claimed are defined as follows:

1. In combination: signal translation means for translating a composite signal including an $A+B$ component, a suppressed carrier amplitude modulation $A-B$ component, both said components being developed from a signal A and a signal B, and a pilot component representative of the frequency and phase of said carrier; means regenerating said carrier under control of said pilot component; means combining said regenerated carrier with said $A+B$ component and said amplitude modulated $A-B$ component to produce a waveform characterized by an upper envelope corresponding to signal A and a lower envelope corresponding to signal B; and means, including a single rectifying junction, coupled to said last mentioned means for separately detecting said signal A and said signal B.

2. In combination: signal translation means for translating a composite signal including an audio summation component, a suppressed carrier amplitude modulated audio difference component, both said audio components being developed from an audio signal A and an audio signal B, and a pilot component representative of the frequency and phase of said carrier; means regenerating said carrier under control of said pilot component; means combining said regenerated carrier with said audio summation component and said amplitude modulated audio difference component to produce a waveform characterized by an upper envelope corresponding to audio signal A and a lower envelope corresponding to audio signal B; and means, including a single rectifying junction interposed between a pair of load circuits, coupled to said last mentioned means for separately detecting said audio signal A and said audio signal B.

3. In combination: signal translation means for translating a composite signal including an audio summation component, a suppressed carrier amplitude modulated audio difference component, both said audio components being developed from an audio signal A and an audio signal B, and a pilot component representative of the frequency and phase of said carrier; means producing a continuous wave signal, equal in phase and frequency but of greater amplitude than said carrier, under control of said pilot component; means combining said continuous wave signal with said audio summation component and said amplitude modulated audio difference component to produce a waveform characterized by an upper envelope corresponding to audio signal A separated from a lower envelope corresponding to audio signal B; and means, including a single rectifying junction interposed between a pair of load circuits, coupled to said last mentioned means for separately detecting said audio signal A and said audio signal B.

4. A frequency modulation multiplex adapter unit comprising an input terminal and first and second output terminals; means applying to said input terminal a composite signal including an audio summation component, an amplitude modulated suppressed carrier audio difference component and a pilot component, said pilot component bearing a predetermined relationship to said suppressed carrier; amplifier means coupled to said input terminal for amplifying said composite signal; means responsive only to said pilot component, coupled to said amplifier means; means coupled to said tuned circuit for generating, under control of said pilot component, an oscillatory signal identical to said carrier in phase and frequency; means combining said oscillatory signal with said audio summation component and said amplitude modulated audio difference component; the resultant combined signal being said oscillatory signal having an envelope A defined by one set of peaks and an envelope B defined by another set of peaks in opposite phase to said first mentioned set of peaks, where said audio summation component is represented by $A+B$ and said audio difference component is represented by $A-B$; a diode detector coupled to said last-mentioned means; a pair of load circuits connected in series with said diode detector; said first and second output terminals being located on opposite terminals of said diode detector whereby an audio signal corresponding to envelope A is developed at said first output terminal and an audio signal corresponding to envelope B is developed at said second output terminal.

5. A frequency modulation multiplex adapter unit comprising an input terminal and first and second output terminals; means applying to said input terminal a composite signal including an audio summation component, an amplitude modulated suppressed carrier audio difference component and a pilot component, said pilot component bearing a predetermined relationship to said suppressed carrier; transistor amplifier means coupled to said input terminal for amplifying said composite signal; a tuned circuit, responsive only to said pilot component, coupled to said transistor amplifier means; transistor oscillator means coupled to said tuned circuit for generating, under control of said pilot component, an oscillatory signal identical to said carrier in phase and frequency; means including a transformer for combining said oscillatory signal with said audio summation component and said amplitude modulated audio difference component; the resultant signal in said transformer being said oscillatory signal having an envelope A defined by one set of carrier peaks and an envelope B defined by another set of carrier peaks in opposite phase to said first mentioned set of carrier peaks, where said audio summation component is represented by $A+B$ and said audio difference component is represented by $A-B$; a diode detector coupled to said transformer; a pair of load circuits connected in series with said diode detector; said first and second output terminals being located on opposite terminals of said diode detector whereby an audio signal corresponding to envelope A is developed at said first output terminal and an audio signal corresponding to envelope B is developed at said second output terminal.

6. A frequency modulation multiplex adapter unit comprising an input terminal coupled to tuner means supplying to said input terminal a composite signal including an audio summation component, an amplitude modulated suppressed 38 kc. carrier audio difference component and a 19 kc. pilot component, said pilot component bearing a predetermined phase relationship to said suppressed carrier; a transistor amplifier coupled to said input terminal for amplifying said composite signal; a 19 kc. tuned circuit coupled to said transistor amplifier; a transistor oscillator coupled to said 19 kc. tuned circuit for generating, under control of said 19 kc. pilot component, a 38 kc. oscillatory signal of the same phase as said 38 kc. carrier; means, including a transformer and a portion of the load circuit of said transistor amplifier, combining said 38 kc. oscillatory signal with said audio summation component and said amplitude modulated audio difference component and producing a resultant waveform comprising said 38 kc. oscillatory signal having an envelope A defined by one set of 38 kc. peaks and an envelope B defined by the opposed set of 38 kc. peaks, where said audio summation component is represented by A+B and said audio difference component is represented by $A-B$; a single diode detector coupled to said transformer for detecting said resultant waveform; a pair of load circuits connected in series with said diode detector; and a first and second output terminal located on opposite terminals of said diode detector, respectively, whereby an audio signal corresponding to envelope A is developed at said first output terminal and an audio signal corresponding to envelope B is developed at said second output terminal.

7. In combination: a demodulator having an input circuit and first and second output circuits, said input and said output circuits each having a common terminal; means applying a complex electric wave to said input circuit, said complex electric wave including a carrier having the envelopes of its positive peaks defining a signal A and the envelopes of its negative peaks defining a signal B; a pair of networks in said demodulator; a diode connected in series with said networks and having its respective terminals coupled to said first and second output circuits; means biasing said diode such that one of the above-said envelopes is maintained wholly within the conductive region of said diode; said networks including peak detector arrangements for said carrier whereby signal A appears in said first output circuit and signal B appears in said second output circuit.

8. In combination: a demodulator having an input circuit and first and second output circuits, said input and said output circuits each having a common terminal; means applying a complex electric wave to said input circuit, said complex electric wave including a carrier having the envelopes of its positive peaks defining a signal L and the envelopes of its negative peaks defining a signal R; said complex wave including an $L+R$ summation component and an $L-R$ amplitude modulated difference component; a pair of networks in said demodulator; a diode connected in series with said networks and having its respective terminals coupled to said first and second output circuits; means generating and adding additional carrier energy to said complex wave to decrease the percentage modulation thereof; said networks including peak detector arrangements for said carrier whereby signal A appears in said first output circuit and signal B appears in said second output circuit.

9. In combination: a demodulator having an input circuit, first and second output circuits, with a common terminal for all said circuits and means applying a complex electric wave to said input circuit; said complex electric wave including a summation component and an amplitude modulated difference component; a pair of peak detector networks in said demodulator; a diode connected in series with said networks and having its respective terminals coupled to said first and second output circuits; said summation component and said difference component being formed by matrixing a signal A and a signal B such that said complex electric wave has the form of a carrier with one envelope defining said signal A and another envelope defining said signal B; said carrier being at least equal to twice the frequency of the maximum frequency of signal A or signal B; means decreasing the percentage modulation of said carrier; said peak detector networks also including filter arrangements for said carrier whereby signal A appears in said first output circuit and signal B appears in said second output circuit.

References Cited in the file of this patent

UNITED STATES PATENTS 3,031,529 Colodny ---------------- Apr. 24, 1962
3,040,132 Wilhelm ---------------- June 19, 1962
3,070,662 Eilers ------------------ Dec. 25, 1962